United States Patent [19]

Cusati

[11] Patent Number: 4,664,643
[45] Date of Patent: May 12, 1987

[54] SEALING DEVICE FOR A UNIVERSAL JOINT CROSS

[75] Inventor: Ward R. Cusati, Litchfield, Conn.

[73] Assignee: The Torrington Company, Torrington, Conn.

[21] Appl. No.: 793,844

[22] Filed: Nov. 1, 1985

[51] Int. Cl.⁴ .............................................. F16D 3/40
[52] U.S. Cl. .................................. 464/131; 277/152; 277/212 C
[58] Field of Search ................ 464/11, 128, 131, 133, 464/136, 173; 277/95, 152, 212 R, 212 F, 212 C

[56] References Cited

U.S. PATENT DOCUMENTS

| | | | |
|---|---|---|---|
| 2,629,992 | 3/1953 | Anderson | 464/133 |
| 3,777,510 | 12/1973 | McElwain | 464/131 X |
| 3,779,039 | 12/1973 | Schultenkamper | 464/131 |
| 3,788,100 | 1/1974 | Pitner | 277/95 X |
| 4,147,041 | 4/1979 | Girguis et al. | 464/133 X |
| 4,348,196 | 9/1982 | Krude et al. | 464/131 X |

FOREIGN PATENT DOCUMENTS 92639  10/1968  France ................... 277/95

Primary Examiner—Daniel P. Stodola
Attorney, Agent, or Firm—Frank S. Troidl

[57] ABSTRACT

The universal joint cross includes a solidified molded plastic hub around the center of the cross. The hub has four integral flexible seals surrounding the pins in the cross. Each seal provides an external seal for a bearing mounted on each of the four exposed pin ends.

2 Claims, 3 Drawing Figures

U.S. Patent     May 12, 1987     4,664,643
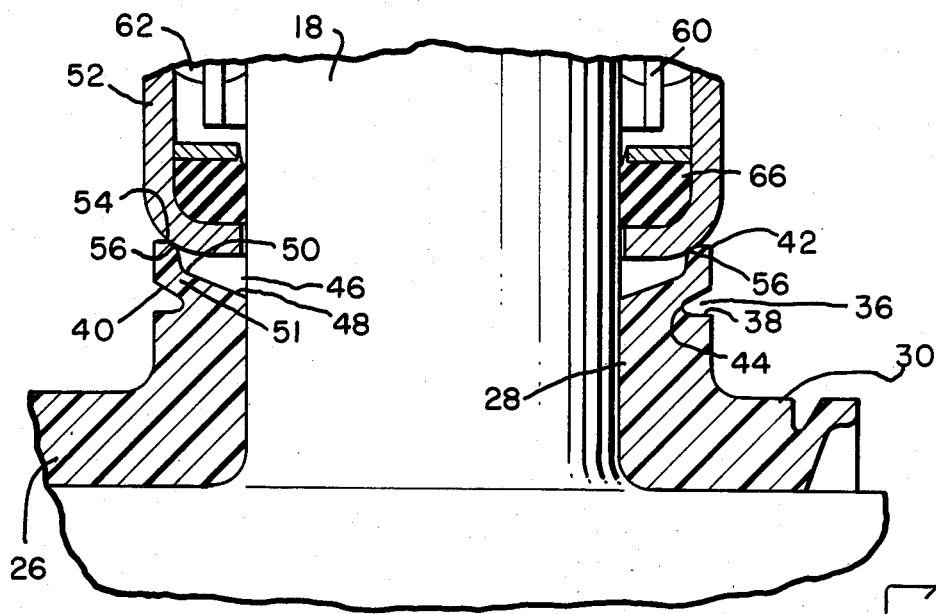
FIG. 2
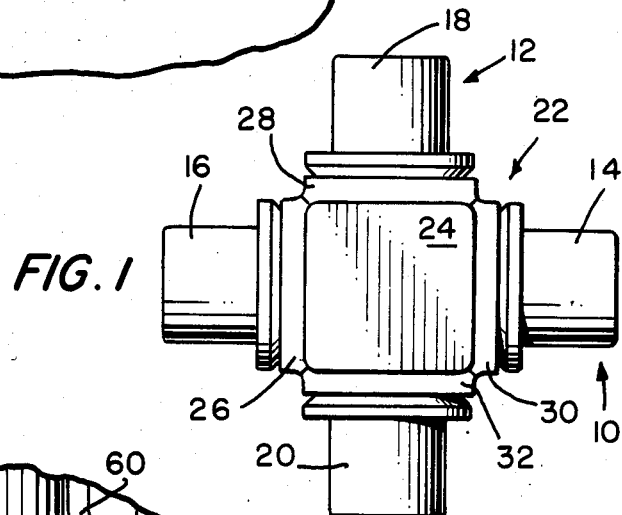
FIG. 1
FIG. 3
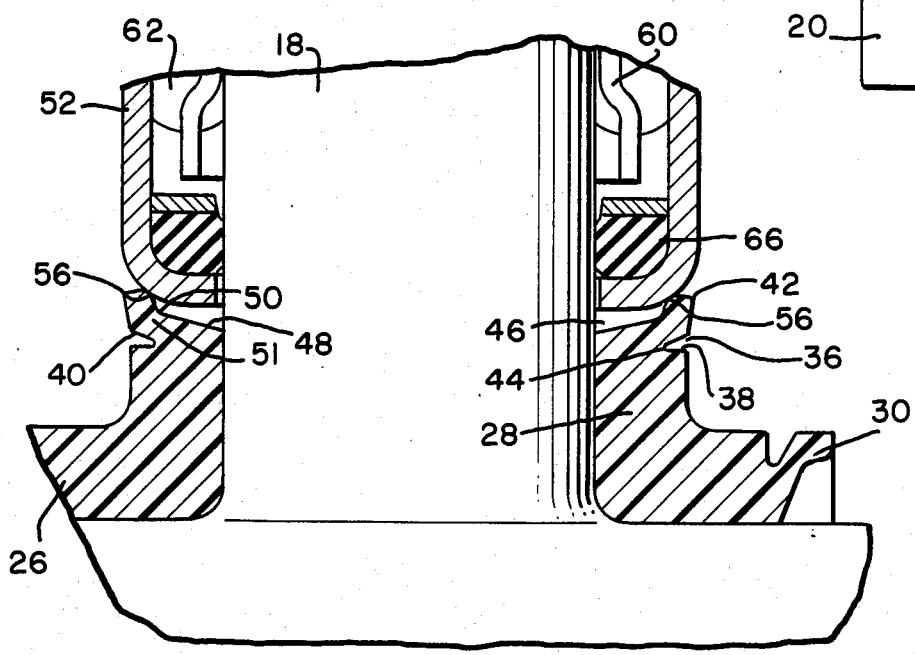

SEALING DEVICE FOR A UNIVERSAL JOINT CROSS

This invention relates to universal joints. More particularly this invention is a universal joint cross which includes a solidified molded plastic hub having integral flexible seals for externally sealing the bearings which are placed around the pin ends.

In the manufacture of universal joints, a common practice is to provide a cross to support bearings, such as needle bearings, and permit the relative rotation of the yokes of the univeral joint. It is customary to secure one yoke to opposite pairs of pins on the cross and to secure the other yoke to the remaining pair of pins on the cross.

Universal joint bearing and cross assemblies generally possess some type of internal and/or external sealing device which provide protection against harsh road contaminants. These devices normally consist of either a seal placed within the casing of the needle bearing or an external seal located between the end of the needle bearing casing and the hub.

This invention is a new universal joint cross. The cross includes a solidified molded plastic hub which has an integral flexible seal for each of the four bearings which are mounted on the four exposed pin ends.

Briefly described, the new universal joint cross comprises a plurality of pins positioned to form a cross. A solidified molded plastic hub is molded about the center of the cross. The hub extends partially along the pins in all four directions from the center of the cross. The hub also has four integral flexible portions extending generally perpendicular to the axis of a pin leaving four exposed pin ends. Each flexible portion has an annular sealing surface. A bearing is mounted on each of the four exposed pin ends and in contact with an annular sealing surface.

The invention, as well as its many advantages, my be further understood by reference to the following detailed description and drawings in which:

FIG. 1 is a side view of a preferred embodiment of cross in accordance with this invention;

FIG. 2 is a fragmentary sectional view of the embodiment of FIG. 1 on an enlarged scale, illustrating one of the flexible seals with a needle bearing mounted on a joint cross pin; and FIG. 3 is a fragmentary sectional view similar to FIG. 2 showing the position of the needle bearing and external seal after the needle bearing has been assembled on the universal joint cross.

In the various figures, like parts are referred to by like numbers.

Referring to the drawings and more particularly to FIG. 1, the new universal joint cross has a first generally cylindrical hardened and ground pin 10 and a second generally cylindrical hardened and ground pin 12. These pins are shown after they are joined together to form a universal joint cross. The joining, for example, may be by the application of controlled amounts of electrical current to join the pins together by controlled heat and high pressure. The pins may also be mechanically joined together with two short pins used in place of one of the pins 10, 12. The two short pins have forked internal ends which press fit over the long pin. The ends 14 and 16 of pin 10, and the ends 18 and 20 of pin 12, serve as bearing surfaces for the annulus of needles in needle bearings (see FIG. 2 and FIG. 3) which are commonly placed over the ends of the pins 10 and 12.

A solidified plastic hub 22 has been molded around the center of the universal joint cross to create thrust surfaces for the needle bearings which are to be placed over the ends 14 and 16 on pin 10 and the ends 18 of 20 of pin 12. The plastic hub 22 is generally in the shape of a cubic center portion 24, having the annular protuberances 26, 28, 30, and 32 extending from the four sides of the center cubic portion 24 through which pins 10 and 12 extend. Annular protuberances 28 and 32 extend in opposite directions partially along pin 12. Annular protuberances 26 and 30 extend in opposite directions partially along pin 10. The extension of each of the annular protuberances is such that the center of the cross is covered by the plastic hub 22 leaving the hardened pin ends 14, 16, 18, and 20 exposed. The needle bearings which are placed over the hardened ends of the pins 10 and 12 thus have the needle rollers in the needle roller bearings in contact with the hardened portions 14, 16, 18, and 20. Contact of needle rollers with hardened portions is necessary for the proper operation of the universal joint.

Referring to FIG. 2 and FIG. 3, an annular groove 36 extends inwardly from the outer perimeter of the annular protuberance 28. The surface 38, which is the groove surface closest to the center of the universal joint cross, is generally perpendicular to the axis of the pin. The annular surface 40 of the annular groove 36 slopes from the bottom of the annular groove 36 toward the outer end 42 of the annular protuberance 28. Groove surfaces 38 and 40 are interconnected by curved surface 44.

A counterbore 46 in protuberance 28 extends from the outer end 42 axially along the pin. The counterbore 46 has a coaxial annular bottom surface 48 surrounding the pin. The bottom surface 48 slopes from the pin toward the outer end 42. A portion 50 of the annular bottom surface 48 overlaps the annular groove 36.

The overlapping portion 50 of the counterbore bottom surface 48 and the sloping surface 40 of groove 36 define an annular flexible neck 51. A needle bearing is mounted on the pin bearing surface 18. The needle bearing includes a casing 52, which may, if desired, be in the form of a drawn cup. The casing 52 has a curved annular surface 54. The annular side surface of the counterbore 46 in the annular protuberance 28 has a curved annular sealing surface 56 which contacts the curved portion 54 of the needle bearing casing 52.

The needle bearing may also have the usual cage 60 which contains the rollers 62. An internal seal 66 may also be provided in the needle bearing.

Comparing FIG. 2 and FIG. 3, it can be seen that due to the flexible neck 51 as the needle bearing is pressed into position on the bearing surface 18, the annular sealing surface 56 follows the contour of the casing curved annular surface 54 and surface 56 deflects radially outwardly and axially toward the center of the cross. The sealing surface 56 pivots about the flexible neck 51.

I claim:

1. A universal joint cross comprising: a plurality of pins positioned to form a cross; a bearing having rollers contained in a casing mounted on each of the ends of the pins; a solidified molded plastic hub around the center of the cross, said hub having an annular protuberance of substantially the same outside diameter along its length extending along a portion of the length of each of the pins and terminating part way along each of the pins in a single flexible annular lip surrounding the pin and in sealing contact with a bearing casing, the annular lip being formed by an annular groove with the annular groove surface closest to the center of the universal joint cross being generally perpendicular to the axis of the pin and the annular groove surface closest to the outer end of the annular protuberance sloping from the bottom of the annular groove toward the outer end of the annular protuberance and a counterbore having a coaxial annular bottom surface surrounding the pin and extending outwardly from the pin to a counterbore annular side surface normally extending coaxially along the pin with a portion of the bottom surface overlapping a portion of the annular groove.

2. A universal joint cross in accordance with claim 1 wherein: each bearing casing has a curved annular surface and the annular side surface of the counterbore has a curved portion in contact with the curved annular surface of the bearing casing whereby the annular lip deflects radially outwardly and axially inwardly when the bearing is pressed into position on the cross.

* * * * *